United States Patent
Ray et al.

(10) Patent No.: US 12,066,882 B2
(45) Date of Patent: Aug. 20, 2024

(54) SYSTEMS AND METHODS FOR MANAGING POWER CONSUMPTION OF DEVICE SUBSYSTEMS

(71) Applicant: Meta Platforms Technologies, LLC, Menlo Park, CA (US)

(72) Inventors: Siddharth Ray, Cupertino, CA (US); Ping Wang, Redmond, WA (US); Achaleshwar Sahai, San Jose, CA (US); Xiaodi Zhang, San Ramon, CA (US); Neeraj Poojary, San Rafael, CA (US); Dong Zheng, Saratoga, CA (US); Guoqing Li, Cupertino, CA (US); Shivank Nayak, Milpitas, CA (US); Madhusudan Kinthada Venkata, South San Diego, CA (US); Swaminathan Balakrishnan, Los Gatos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/718,881

(22) Filed: Apr. 12, 2022

(65) Prior Publication Data
US 2023/0324979 A1 Oct. 12, 2023

(51) Int. Cl.
*G06F 1/32* (2019.01)
*G06F 1/3287* (2019.01)

(52) U.S. Cl.
CPC .................. *G06F 1/3287* (2013.01)

(58) Field of Classification Search
CPC ...................................... G06F 1/3287
See application file for complete search history.

(56) References Cited

U.S. PATENT DOCUMENTS

| | | | | |
|---|---|---|---|---|
| 5,664,201 | A * | 9/1997 | Ikedea | G06F 1/324 713/320 |
| 2015/0067377 | A1 | 3/2015 | Park et al. | |
| 2017/0300108 | A1* | 10/2017 | Yang | G06F 1/28 |
| 2017/0371390 | A1 | 12/2017 | Wang et al. | |

(Continued)

OTHER PUBLICATIONS

International Search Report and Written Opinion for International Application No. PCT/US2023/018183, mailed Jul. 14, 2023, 11 pages.

*Primary Examiner* — Stefan Stoynov
(74) *Attorney, Agent, or Firm* — Foley & Lardner LLP

(57) ABSTRACT

Systems and methods for managing power consumption of device subsystems include a device which maintains one or more constraint metric tables for applications executable on the device. Each of the one or more constraint metric tables may specify respective power levels for subsystems of the device according to a respective application or an application type of the respective application. The device may determine to operate the device at a reduced power level for a first application, based on a condition for the device satisfying at least one of a thermal threshold criteria or a power threshold criteria when the device operates at full power level. The device may apply a constraint metric responsive to determining to operate at the reduced power level, to cause a subset of the plurality of subsystems to adjust a power consumption level according to a first constraint metric table corresponding to the first application.

18 Claims, 9 Drawing Sheets

(56) References Cited

U.S. PATENT DOCUMENTS

| | | |
|---|---|---|
| 2018/0101205 A1 | 4/2018 | Conroy et al. |
| 2018/0329465 A1 | 11/2018 | Tavakoli et al. |
| 2021/0232201 A1 | 7/2021 | Chen et al. |

* cited by examiner

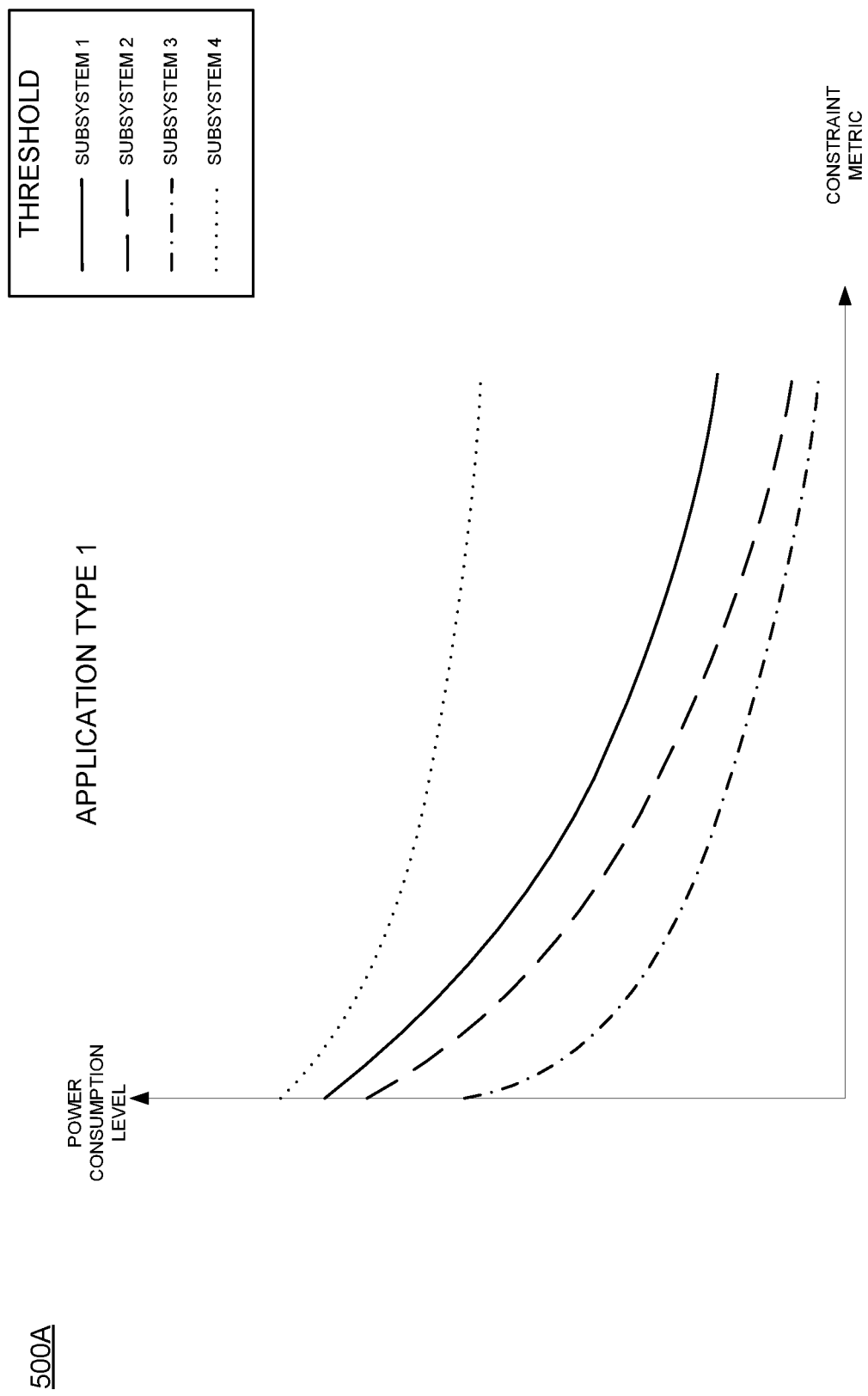

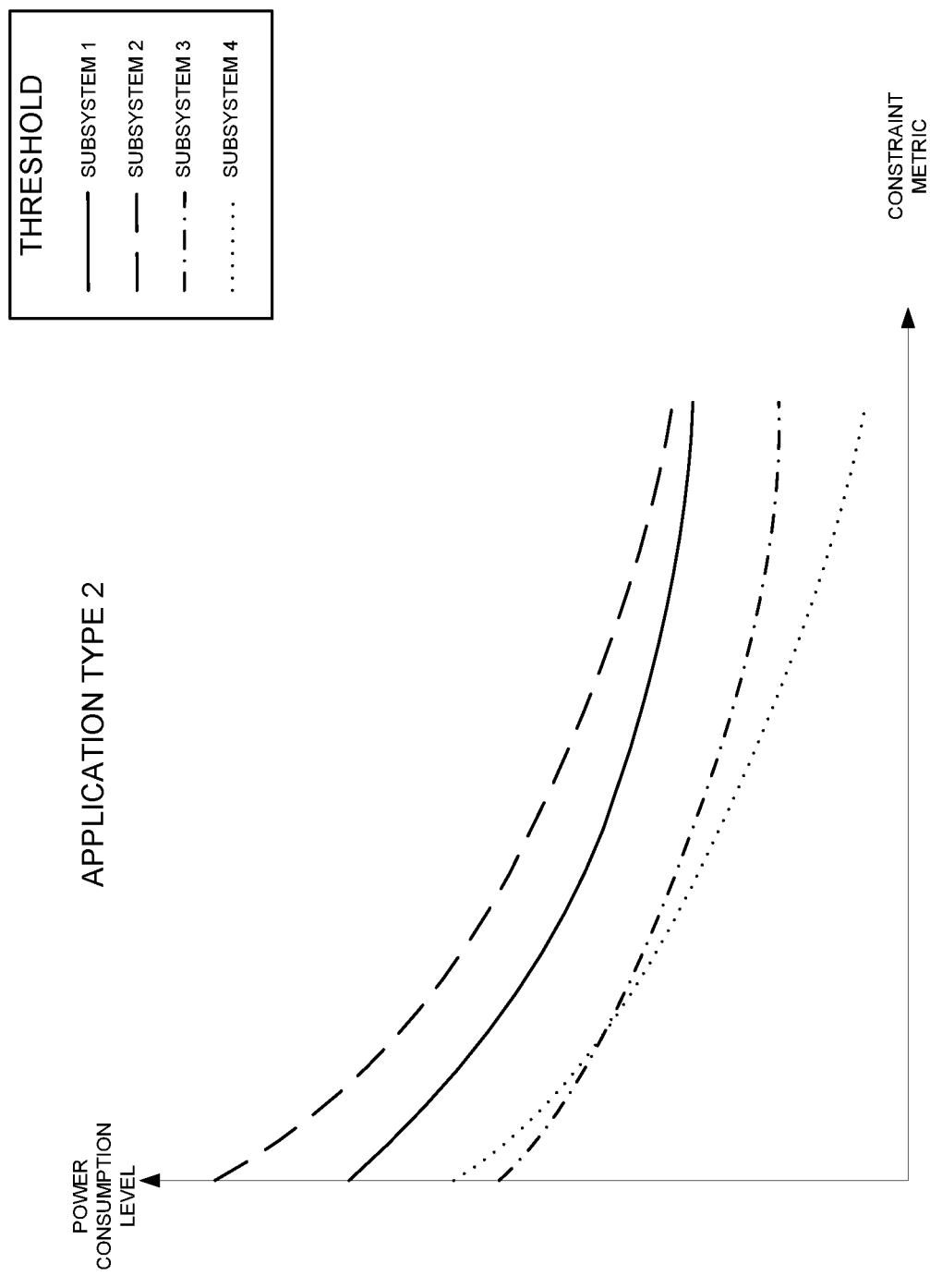

SYSTEMS AND METHODS FOR MANAGING POWER CONSUMPTION OF DEVICE SUBSYSTEMS

FIELD OF DISCLOSURE

The present disclosure is generally related to power management, including but not limited to managing power consumption of device subsystems.

BACKGROUND

Devices, such as battery operated or wireless devices, typically include some power/thermal management system. However, often times these systems are implemented at the hardware control level and are reactive in nature. As a result, these systems may universally reduce power consumption across hardware components of the device.

SUMMARY

In one aspect, this disclosure is directed to a method. The method may include maintaining, by a device, one or more constraint metric tables for applications executable on the device. Each of the one or more constraint metric tables may specify respective power levels for subsystems of the device according to a respective application or an application type of the respective application. The method may include determining, by the device, to operate the device at a reduced power level for a first application, based on a condition for the device satisfying at least one of a thermal threshold criteria or a power threshold criteria when the device operates at a full power level. The method may include applying, by the device, a constraint metric responsive to determining to operate at the reduced power level, to cause a subset of the plurality of subsystems to adjust a power consumption level according to a first constraint metric table corresponding to the first application.

In some embodiments, applying the constraint metric comprises transmitting, by a controller of the device, the constraint metric to each of the subsystems of the device. In some embodiments, the controller is part of an operating system for the device or comprises the operating system. In some embodiments, the method includes identifying, by a first subsystem, the first constraint metric table of the one or more constraint metric tables according to at least one of: the first application or the applied constraint metric, and modifying, by the first subsystem, a power consumption level of the first subsystem, according to a power level specified in the first constraint metric table for the first subsystem. In some embodiments, the power level is a first power level for the first subsystem. The method may include identifying, by a second subsystem, the first constraint metric table. The method may include determining, by the second subsystem, that a current power consumption level of the second subsystem is within a second power level for the second subsystem specified in the first constraint metric table.

In some embodiments, the one or more constraint metric tables includes a first constraint metric table for a first application and a second constraint metric table for a second application. The first constraint metric table may specify a first power level for a first subsystem, and the second constraint metric table may specify a second power level for the first subsystem different from the first threshold power level. In some embodiments, the first constraint metric table is associated with a plurality of applications having an application type that is same as that of the first application.

In some embodiments, the constraint metric causes a first subsystem of the plurality of subsystems to adjust a power consumption level of the first subsystem by a first degree, and causes a second subsystem to bypass adjustment of a power consumption level of the second subsystem or to adjust the power consumption level of the second subsystem by a second degree different from the first degree. In some embodiments, the condition satisfying the at least one of the thermal threshold criteria or the power threshold criteria when the device operates at the full power level includes a power consumption of the device being greater than or equal to a power threshold, or a temperature or thermal output of the device being greater than or equal to a thermal threshold, when the device operates at the full power level. In some embodiments, the plurality of subsystems includes at least one of an audio subsystem, a camera subsystem, a sensor subsystem, a communication subsystem, a display unit subsystem, a central processing unit (CPU) subsystem, or a graphics processing unit (GPU) subsystem.

In another aspect, this disclosure is directed to a device. The device may include a plurality of subsystems. The device may include one or more constraint metric tables for applications executable on the device, each of the one or more constraint metric tables specifying respective power levels for one or more subsystems of the plurality of subsystems according to a respective application or an application type of the respective application. The device may include one or more processors communicably coupled to the plurality of subsystems. The one or more processors may be configured to determine to operate the device at a reduced power level for a first application, based on a condition for the device satisfying at least one of a thermal threshold criteria or a power threshold criteria when the device operates at a full power level. The one or more processors may be configured to apply a constraint metric responsive to determining to operate the device at the reduced power level, to cause a subset of the plurality of subsystems to adjust a power consumption level according to a first constraint metric table corresponding to the first application.

In some embodiments, the one or more processors are configured to transmit the constraint metric to each of the plurality of subsystems of the device. In some embodiments, a first subsystem of the plurality of subsystems is configured to identify the constraint metric table of the one or more constraint metric tables according to the first application, and can modify a power consumption level according to a power level specified in the first constraint metric table for the first subsystem. In some embodiments, the power level is a first power level for the first subsystem. A second subsystem of the plurality of subsystems may be configured to identify the first constraint metric table, and can determine that a current power consumption level of the second subsystem is within a second power level for the second subsystem specified in the first constraint metric table.

In some embodiments, the one or more constraint metric tables includes a first constraint metric table for a first application and a second constraint metric table for a second application. The first constraint metric table may specify a first power level for a first subsystem, and the second constraint metric table may specify a second power level for the first subsystem different from the first threshold power level. In some embodiments, the constraint metric table is associated with a plurality of applications having an application type that is the same as that of the first application. In some embodiments, the constraint metric causes a first subsystem of the plurality of subsystems to adjust a power consumption level of the first subsystem by a first degree, and causes a second subsystem to bypass adjustment of a power consumption level of the second subsystem or to adjust the power consumption level of the second subsystem by a second degree different from the first degree. In some embodiments, the condition satisfying the at least one of the thermal threshold criteria or the power threshold criteria when the device operates at the full power level includes a power consumption of the device being greater than or equal to a power threshold, or a temperature or thermal output of the device being greater than or equal to a thermal threshold, when the device operates at the full power level. In some embodiments, the plurality of subsystems includes at least one of an audio subsystem, a camera subsystem, a sensor subsystem, a communication subsystem, a display unit subsystem, a central processing unit (CPU) subsystem, or a graphics processing unit (GPU) subsystem.

In another aspect, this disclosure is directed to a non-transitory computer readable medium storing instructions that, when executed by one or more processors of a device, cause the one or more processors to execute an operating system of the device. The operating system may be configured to determine to operate the device at a reduced power level for a first application, based on a condition for the device satisfying at least one of a thermal threshold criteria or a power threshold criteria when the device operates at a full power level. The one or more processors may be configured to apply a constraint metric responsive to determining to operate the device at the reduced power level, to cause a subset of a plurality of subsystems of the device to adjust a power consumption level according to a first constraint metric table corresponding to the first application.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIGS. 5A-5C are example graphs showing constraint metrics and corresponding power levels for different application types, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section A discloses an artificial reality system which may be useful for practicing embodiments described herein;

Section B discloses a computing system which may be usable to implement aspects of the present disclosure; and Section C discloses systems and methods for managing power consumption of device subsystems.

A. Artificial Reality System

Figure 1:
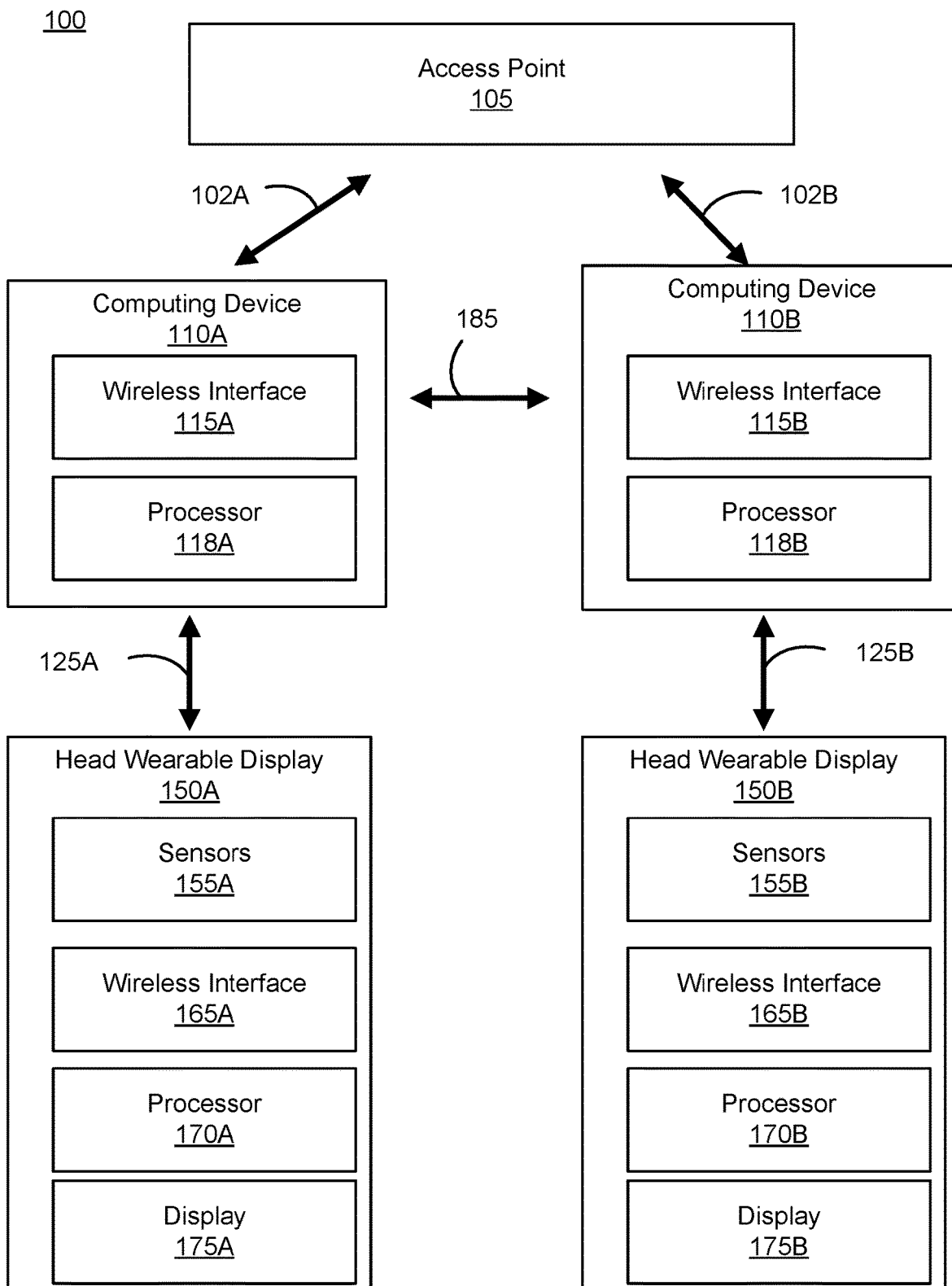
FIG. 1 is a diagram of a system environment including an artificial reality system, according to an example implementation of the present disclosure.

Disclosed herein are systems and methods for facilitating distribution of artificial reality (e.g., augmented reality (AR), virtual reality (VR), or mixed reality (MR)) content. FIG. 1 is a block diagram of an example artificial reality system environment 100. In some embodiments, the artificial reality system environment 100 includes a head wearable display (HWD) 150 worn by a user, and a console 110 providing content of artificial reality to the HWD 150. The HWD 150 may detect its location and/or orientation of the HWD 150, and provide the detected location/or orientation of the HWD 150 to the console 110. The console 110 may generate image data indicating an image of the artificial reality according to the detected location and/or orientation of the HWD 150 as well as a user input for the artificial reality, and transmit the image data to the HWD 150 for presentation.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming, for an example, that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming, for another example, that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110, or a combination of them, may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation, and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming, for an example, that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location, and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location, and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space, and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location, and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, a barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location, and an orientation of the HWD 150 in a physical space into a virtual space (or simultaneous localization and mapping (SLAM) data), motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 is a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
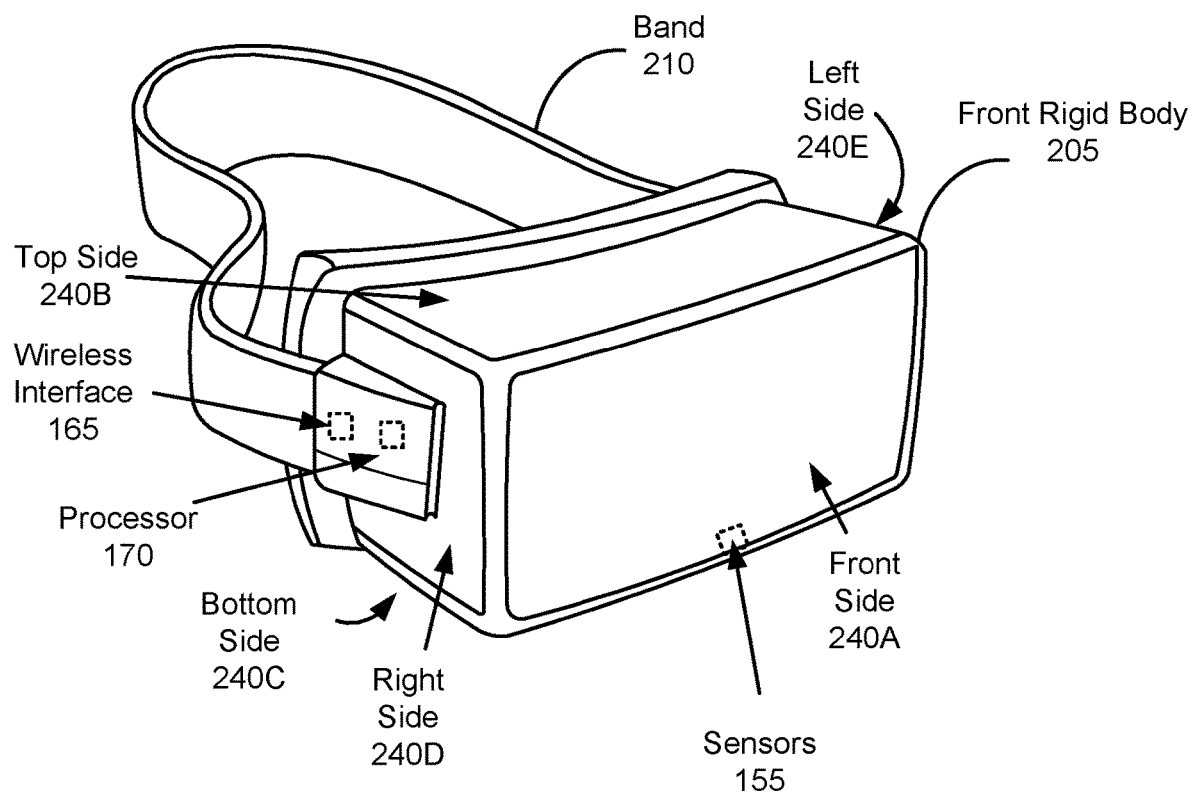
FIG. 2 is a diagram of a head mounted display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2. In some embodiments, the HWD 150 may include a plurality of communications interfaces 165. Similarly, the console 110 of FIG. 1 may include a plurality of communications interfaces 115. As described in greater detail below in section B, the communications interface(s) 115, 165 may be configured to selectively perform beamforming to optimize the communications channel between the console 110 and HWD 150.

Similarly, the console 110 and HWD 150 may dynamically and intelligently switch between active and idle communications interface(s) 115, 165 to optimize the communications channel between the console 110 and HWD 150.

B. Computing System

Figure 3:
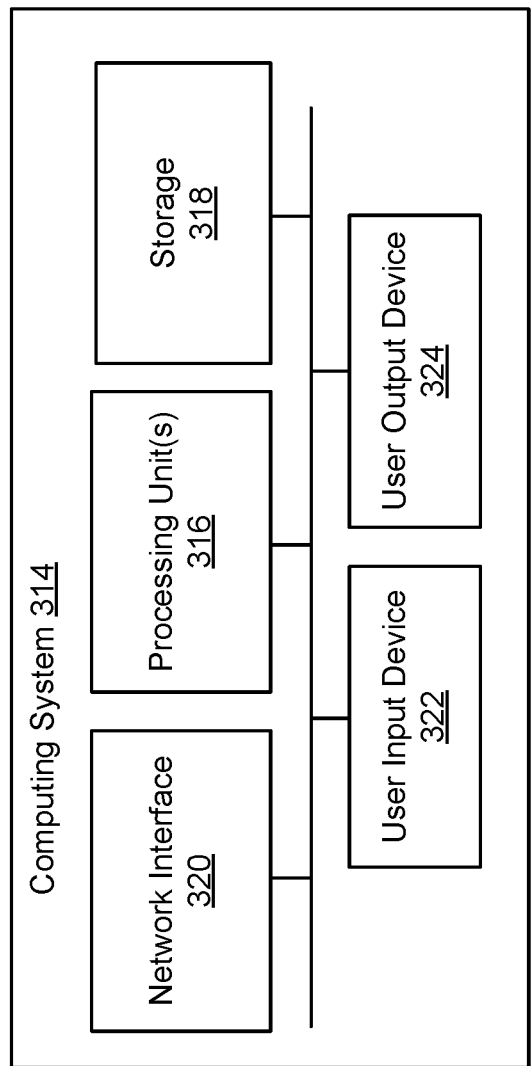
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 314 can be implemented to provide VR, AR, or MR experiences. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse, or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, (e.g., a liquid crystal display (LCD)), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations (e.g., by programming a processor or providing appropriate control circuitry) and various blocks might or might not be reconfigurable depending on how the initial configuration is obtained. Implementations of the present disclosure can be realized in a variety of apparatuses including electronic devices implemented using any combination of circuitry and software.

C. Systems and Methods for Managing Power Consumption of Device Subsystems

Figure 4:
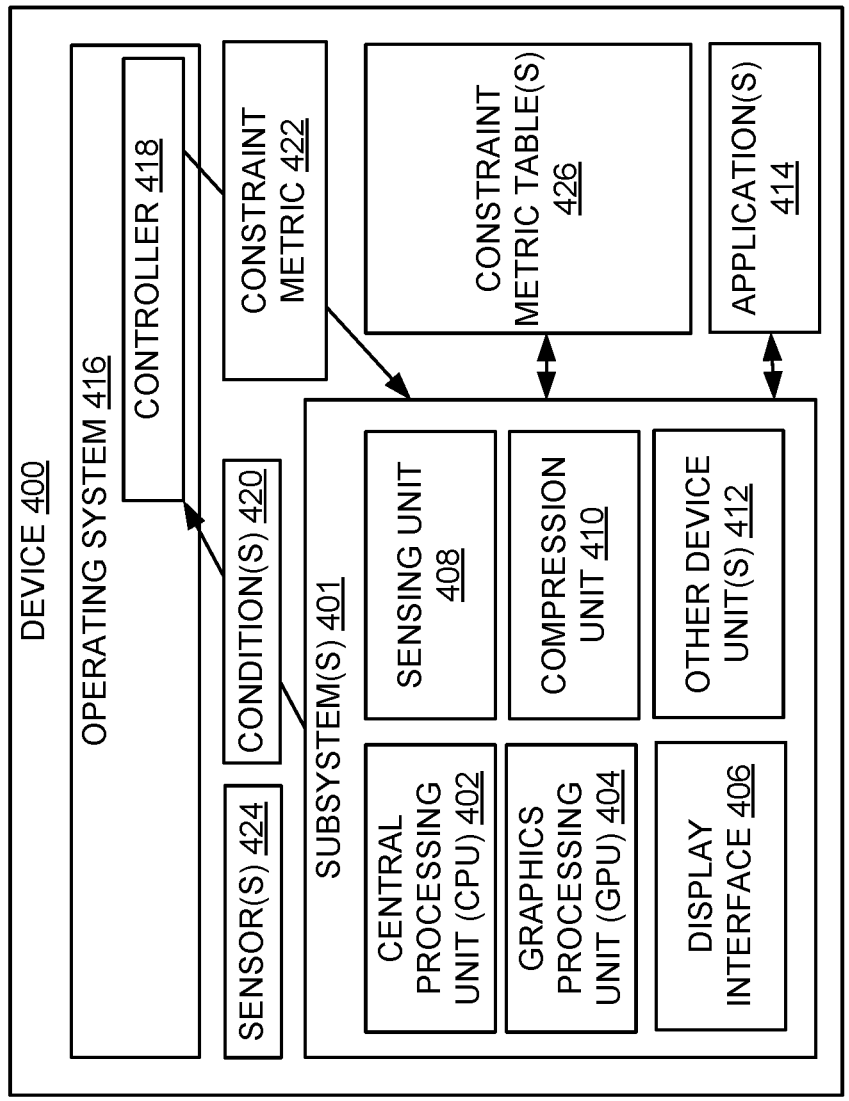
FIG. 4 is a block diagram of a device, according to an example implementation of the present disclosure.

Referring now to FIG. 4, depicted is a device 400, according to an example implementation of the present disclosure. The device 400 is shown to include various device units or subsystems 401 (e.g., processing/functional units/blocks/components), including a central processing unit (CPU) 402, a graphics processing unit (GPU) 404, a display interface 406, a sensing unit 408, a compression unit 410, and/or various other units 412, such as a camera unit, an I/O unit, decoders/encoders, and/or other processing units of the device. In use, each of the device units may consume power at various rates and amounts/levels, which may depend on the particular application 414 or resource being accessed on the device 400. For example, during a video call or conference using a corresponding application 414, some units/subsystems 401 (such as the display interface 406, camera unit, a communication unit, and GPU 404) may consume more power than other units or subsystems 401 (such as the sensing unit 406, I/O unit, etc.), based on functions or tasks which are to be performed by those units 401. As another example, while the device 400 is executing a local gaming application 414, some units/subsystem 401 (such as the display interface 406, CPU 402, GPU 404, sensing unit 408) may consume more power than other units or subsystems 401 (such as the compression unit 410, decoders/encoders, etc.).

Some devices may include hardware controller(s) which monitor thermal or power consumption levels of the device. Where the thermal or power consumption levels increase too rapidly or exceed a threshold, the hardware controller(s) may universally reduce power consumption across each of the device subsystems. For example, the hardware controller(s) may reduce or throttle overall power consumption of the device (e.g., by 20%) such that each of the device subsystems reduce their power consumption by 20%. The hardware controller(s) may function as a protective measure against device damage (e.g., due to thermal output of the device/overheating, burnout, etc.). However, by universally reducing power consumption across each of the device subsystems, user experience may be reduced, as overall device performance is degraded.

According to the systems and methods of the present solution, the device 400 may be configured to maintain one or more constraint metric tables 426 for applications 414 executable on or supported by the device. The constraint metric tables 426 may be configured to specify power levels for the subsystems 401 of the device 400 according to a respective application 414 or application type of the application 414 which is executing on the device 400. The device 400 may be configured to determine to operate the device 400 at a reduced power level for a first application 414 based on a condition 420 of the device 400 satisfying a thermal threshold criteria or power threshold criteria when the device 400 operates at a full level. The device 400 may apply a constraint metric 422 responsive to determining to operate at the reduced power level. By applying the constraint metric, at least a subset of the plurality of subsystems 401 may be configured to adjust a power consumption level of the subsystem 401 according to a first constraint metric table 426 corresponding to (or configured/established for) the first application 414.

As shown in FIG. 5, the device 400 may include an operating system (OS) 416. The operating system 416 may be or include system-level software deployed or otherwise executing on the device 404 that manages device hardware, software, and/or provides services of the device 400. In some embodiments, the operating system 416 may include/execute a controller 418. The controller 418 may be a part of the operating system 416 or may include/comprise the operating system 416. In other words, the controller 418 may be the processors/processing components/hardware which deploys or otherwise executes the operating system 416. The controller 418 may be configured to execute instructions from memory of the device 400 to provide the operating system 416. The controller 418 may be configured to execute instructions as part of providing the operating system 416, to manage power consumption at the subsystem 401 level.

The device 400 may include one or more sensor(s) 424. The sensor(s) 424 may be or include any device, component, element, or hardware configured to sense, monitor, measure, detect, or otherwise identify various condition(s) 420 of the device 400. The sensor(s) 424 may be configured to identify conditions 420 of the device 400 as subsystems 401 execute on the device 400 or otherwise perform functions for the device 400. The sensor(s) 424 may include temperature sensor(s) 424 (such as a thermometer) configured to identify a temperature or thermal condition/level of the device 400. The sensor(s) 424 may include power sensor(s) (such as a power meter, current sensor, configured to identify a power consumption condition of the device 400. The power consumption condition may include total (e.g., aggregate) power, average power, etc. of the device 400 across some or all of the subsystems 401 of the device 400.

The device 400 may be configured to execute one or more applications 414. The device 400 may be configured to execute one or more application(s) 414 responsive to a user request (e.g., to an I/O unit or subsystem of the device 400) which selects/activates an icon corresponding to the application 414 or otherwise launches the application 414. The device 400 may be configured to execute different types of applications 414. For example, the device 400 may be configured to execute video/audio streaming applications 414, video/audio conferencing applications 414, gaming applications 414, messaging applications 414, data storage applications 414, and so forth. In some embodiments, each application 414 may include or otherwise maintain information which indicates an application type for the application 414. For example, the applications 414 may be tagged (e.g., by an app developer) with their application type. When a user of the device 400 installs, deploys, or otherwise executes the application 414 on the device 400, the device 400 may be configured to determine an application type for the application 414.

The controller 418 may be configured to receive, identify, or otherwise determine the condition 420 (e.g., temperature or thermal condition/level, application speed/response/latency, battery/power level, average/peak power consumption level/rate) of the device 400. The controller 418 may be configured to determine the condition 420 of the device 400 based on sensor data from the sensor(s) 424 of the device 400. The controller 418 may be configured to determine the condition 420 of the device 400 while the device 400 executes/performs/supports an application 414. The controller 418 may be configured to determine the condition 420 of the device 400 as the device 400 (e.g., the subsystems 401 of the device 400) executes/performs/supports the application 414.

The controller 418 may be configured to maintain or otherwise access one or more thresholds. The thresholds may include, for example, a thermal threshold and/or a power threshold. The controller 418 may be configured to compare the condition 420 of the device 400 to the thermal threshold and/or the power threshold. In some embodiments, the controller 418 may be configured to compare a thermal condition (e.g., thermal/energy/heat output/level, for instance measured or otherwise detected by the temperature sensor(s) 424) to the thermal threshold. The controller 418 may be configured to determine whether the thermal condition satisfies a thermal threshold criteria based on the comparison. For example, the thermal condition may satisfy the thermal threshold criterial responsive to the thermal condition (e.g., temperature) being greater than or equal to the thermal threshold.

The controller 418 may be configured to determine to operate at a reduced power level for the application executing on the device 400. In some embodiments, the controller 418 may be configured to determine to operate at a reduced power level from a full (or maximum/unrestricted) power level while the device 400 executes the application 414. In some embodiments, the controller 418 may be configured to determine to operate at a reduced power level based on the condition of the device 400 as compared to one or more of the thresholds maintained by the device 400.

In some embodiments, the controller 418 may be configured to compare a power condition (e.g., measured or otherwise detected by the power/current sensor(s) 424) to the power threshold. The controller 418 may be configured to determine whether the power condition satisfies a power threshold criteria based on the comparison. For example, the power condition may satisfy the power threshold criteria responsive to the power condition (e.g., average/peak/instantaneous power consumption, current draw, present power consumption, etc.) being greater than or equal to the power threshold. In some embodiments, the controller 418 may be configured to determine whether either the thermal threshold criteria and/or the power threshold criteria are satisfied/met/exceeded.

The controller 418 may be configured to generate, establish, set, or otherwise determine a constraint metric 422. The controller 418 may be configured to determine the constraint metric 422 responsive to determining to operate the device 400 at the reduced power level. The constraint metric may be a value set by the controller 418 and can be used by each of the subsystem(s) 401 to selectively adjust their power consumption level. In some embodiments, the constraint metric 422 may be a device-wide (e.g., a subsystem wide) value set by the controller 418. The constraint metric 422 may be a value which is proportional to, generated in relation to, or otherwise corresponds to an amount/difference/degree in which the power condition/thermal condition exceeds/surpasses the power/thermal threshold. For example, as the power condition exceeds the power threshold by a greater degree, the controller 418 may reduce the constraint metric 422 by a greater degree. In some embodiments, the constraint metric 422 may be a subsystem-specific value. For example, the controller 418 may be configured to compute, set, define, generate, or otherwise determine the constraint metric 422 for each individual subsystem 401 of the device 400. The controller 418 may be configured to determine the constraint metric 422 for each of the subsystems 401 according to, for example, the application 414 executing on or supported by the device 400 or an application type of the application 414 executing on or supported by the device 400.

The controller 418 may be configured to transmit, send, provide, or otherwise apply the constraint metric 422. In some embodiments, the controller 418 may be configured to apply the constraint metric 422 responsive to determining to operate the device 400 at a reduced power level. In some embodiments, the controller 418 may be configured to apply the constraint metric 422 by transmitting or providing the constraint metric 422 to the individual subsystems 401. In some embodiments, the controller 418 may be configured to provide the constraint metric 422, with or including an application identifier (ID) or application type of the application 414 executing on the device 400. The application ID and/or type may be used by the subsystems 401 to determine, select, or otherwise identify a constraint metric table 426 to be used for selectively adjusting a power of the subsystem 401, for a specific application for instance. The constraint metric may include/indicate an index, entry or other look-up value for accessing information in the constraint metric table 426. In some embodiments, the controller 418 may be configured to apply the constraint metric 422 by setting a look-up value for a data entry in the constraint metric table 426, corresponding to the constraint metric 422.

The subsystems 401 may be configured to determine the value for the constraint metric 422 (e.g., responsive to receiving the value from the controller 418, responsive to performing a look-up of the constraint metric 422, etc.). In some embodiments, the subsystems 401 may be configured to select, determine, or otherwise identify a constraint metric table 426 from a plurality of constraint metric tables 426 to be used for selecting threshold power level for the respective subsystems 401, and/or adjusting power consumption levels of the respective subsystems 401. In some embodiments, the constraint metric tables 401 may be specific to particular applications. For example, each application 414 executable on the device 400 may have a corresponding application constraint metric table 426. The subsystems 401 may be configured to determine an application 414 executing on the device 400 (e.g., using the application ID received from the controller 418, by querying the OS 416, etc.). The subsystems 401 may be configured to select the application constraint metric table 426 for the application 414 (e.g., using the application ID, and matching the application ID to an ID for the application constraint metric table 426).

Figure 5C:
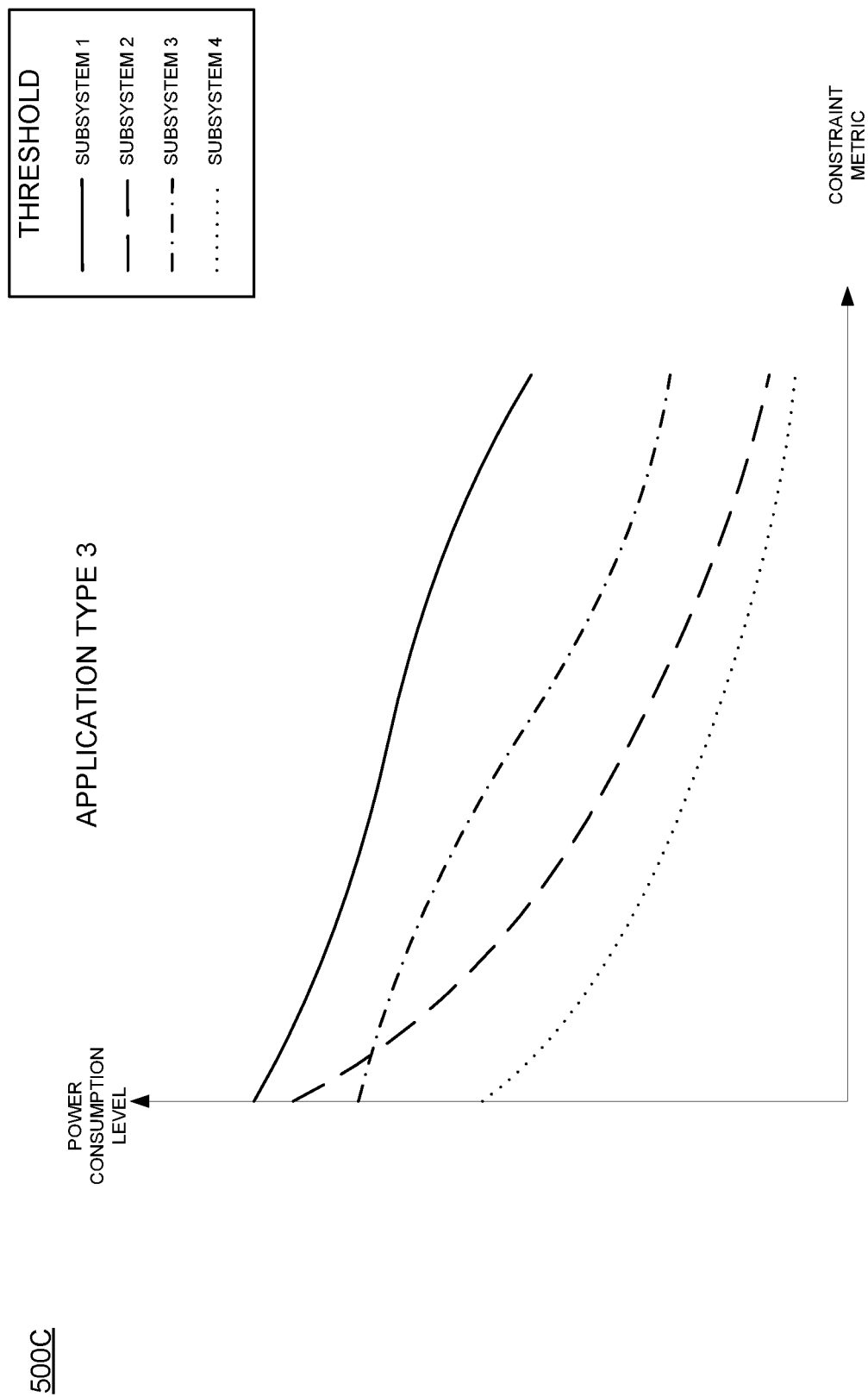

In some embodiments, the constraint metric tables 401 may be specific to particular types of applications. Referring now to FIG. 5A-FIG. 5C, depicted are graphs showing, representing or corresponding to different constraint metric tables 500A-500C for different application types. For example, a device 400 can maintain, include, incorporate, or otherwise access a first constraint metric table 500A for a first application type (e.g., video conferencing applications 414), a second constraint metric table 500B for a second application type (e.g., gaming applications 414), a third constraint metric table 500C for a third application type (e.g., streaming applications 414), etc. The device 400 may maintain any number of constraint metric tables 500 for any number of application types of applications 414 executable on the device 400. In some embodiments, the constraint metric tables 500 may be generated for each device 400 (e.g., by a device manufacturer) and can be loaded/programmed onto the device 400 at deployment/manufacture. In some embodiments, the constraint metric tables 500 may be generated and can be maintained at the operating system-level 416 such that the constraint metric tables 500 may be updated from time to time (e.g., by or as part of updating/upgrading the OS 416 of the device 400). A constraint metric table can include/indicate/specify respective threshold power levels for the device's subsystems, for each constraint metric. For instance, a particular constraint metric can be used to index into the constraint metric table to access/determine a corresponding group of threshold power levels for the subsystems. Various threshold power (consumption) levels for a particular subsystem can vary with the value of the constraint metric, and can be represented by a threshold graph (or plot/curve). While shown as a continuous or substantially continuous plot in FIG. 5A-FIG. 5C, it is noted that the constraint metrics and corresponding threshold power levels for the subsystems may have various steps or levels of granularity. As described in greater detail below, a given subsystem 401 may receive a constraint metric from the controller 418, identify a constraint metric table which corresponds to the application executing/provided by the device, and use the constraint metric as an index to identify a power threshold level for the subsystem.

As shown in FIG. 5A-FIG. 5C, the constraint metric tables 500 may include/represent/indicate subsystem-specific thresholds, which can be represented by a first threshold graph (shown in solid line) for a first subsystem 401, a second threshold graph (shown in dashed line) for a second subsystem 401, a third threshold graph (shown in dot-dashed line) for a third subsystem 401, and a fourth threshold graph (shown in dotted line) for a fourth subsystem 401. While shown as four threshold graphs, it is noted that the constraint metric tables 500 may include/represent threshold graphs for each of the subsystems 401 of the device 400. Each of the threshold graphs may indicate or include a (threshold) power level for a particular constraint metric 422. The power level may be a maximum (e.g., not to exceed, upper limit, etc.) power level of the subsystem 401 for a particular constraint metric 422. The threshold power levels may be selected or otherwise defined to optimize/improve user experience as power of the device 400 is reduced.

Each of the subsystems 401 may be configured to identify a constraint metric table 426 from the plurality of constraint metric tables 426 based on an application type of the application 414 executing on the device 400. In some embodiments, the subsystems 401 may be configured to determine the application type for the application 414 using the application identifier for the application 414. For example, the device 400 may be configured to maintain a database or other data structures which includes application identifiers for each of the applications 414 executable/supported/accessible on the device 400 and an identifier for the corresponding constraint metric table 426 to be used for the application 414. The device 400 may be configured to use the application identifier to perform a look-up in the database to identify a corresponding identifier for the constraint metric table 426. As another example, each constraint metric table 426 may include various tags which are to be used to match application tags with the corresponding constraint metric table 426. As discussed above, applications 414 may be tagged by application developers (e.g., when the application 414 is deployed). The subsystems 401 may be configured to use the tags for the applications 414 to match the application 414 with a corresponding constraint metric table. For example, a video conferencing application 414 may be tagged with a "VIDEO CONFERENCE" tag. Similarly, a constraint metric table 426 for video conferencing applications may be tagged with a "VIDEO CONFERENCE" tag. The subsystems 401 may be configured to identify the tag(s) of the application 414 (e.g., video conferencing application 414) executing on the device 400 and select the constraint metric table 426 for video conferencing applications responsive to the tags being matched.

Figure 6:
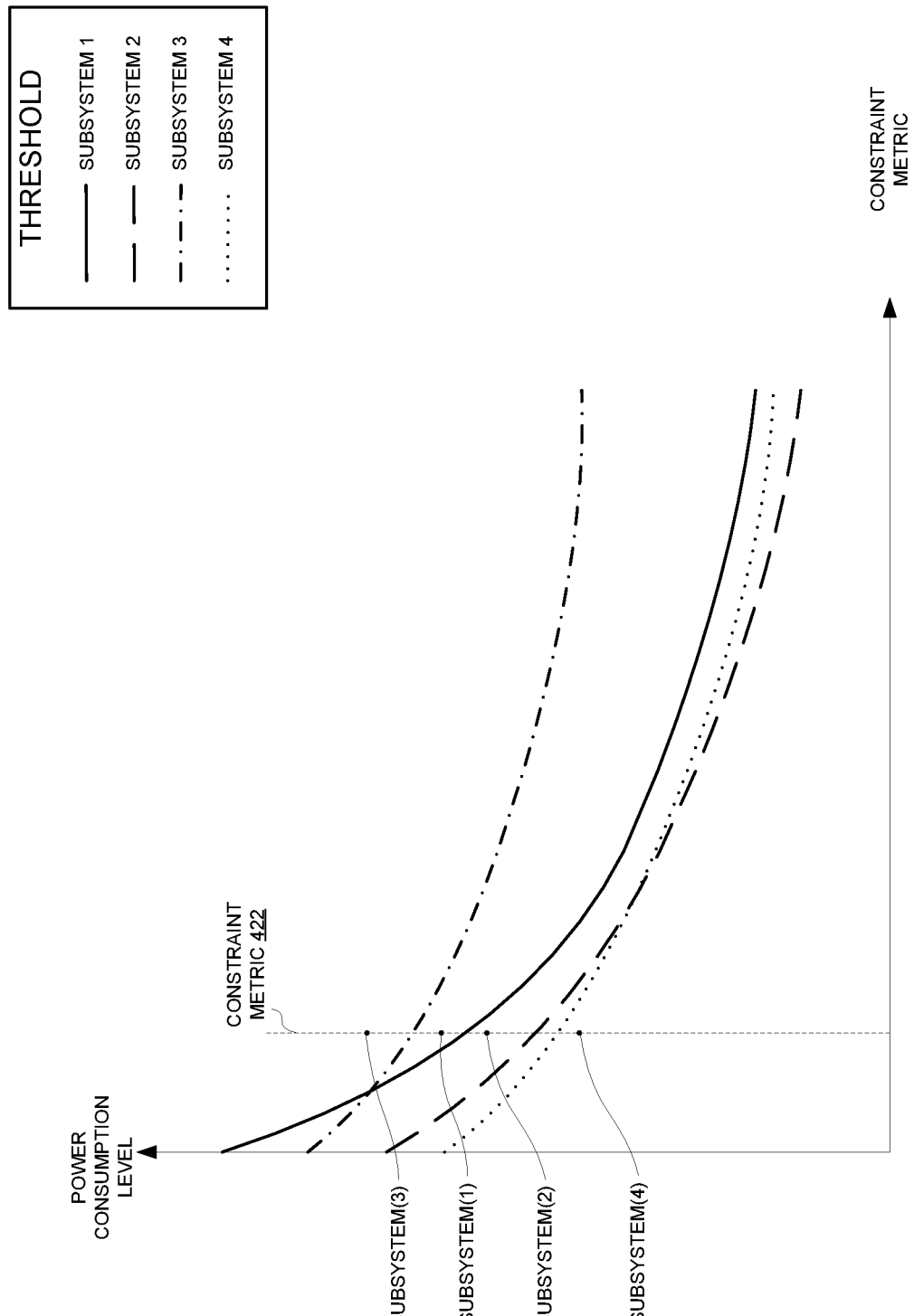
FIG. 6 is an example graph showing constraint metrics and corresponding power levels for different subsystems (e.g. of the device of FIG. 4), according to an example implementation of the present disclosure

Referring now to FIG. 6, depicted is a graph 600 showing example applications of a constraint metric 422 at the subsystem 401 level, according to an example implementation of the present disclosure. The graph 600 may be representative/illustrative of threshold power levels of various subsystems at various constraint metric values. Following the receiving of the constraint metric 422 and identifying the constraint metric table 426 for the application 414 executing on the device 400, the subsystems 401 may be configured to determine/calculate/estimate their respective power consumption level (e.g., by determining a voltage and current draw as an input to the subsystem 401, for example). The subsystems 401 may be configured to determine a threshold power level of a respective subsystem 401 at the corresponding constraint metric 422 (e.g., received from the controller 418 or otherwise identified by each of the subsystems 401). For example, the subsystems 401 may be configured to perform a look-up function in/of the constraint metric table 426 using an identifier for the subsystem 401 (e.g., subsystem ID) and/or the constraint metric to identify or determine the threshold power level. As shown in FIG. 6 and discussed above, each subsystem 401 may have a different threshold power level, based on the particular application 414 executing/accessed/supported on the device 400, and/or based on the specific value of the constraint metric 422.

Each subsystem 401 may be configured to compare their respective threshold power level to the respective (actual/estimated/measured) power consumption level for the subsystem 401. As such, the comparison may be done by each subsystem 401 on a subsystem-by-subsystem basis. The subsystems 401 may be configured to determine whether their power consumption level exceeds the corresponding threshold power level from the constraint metric table 426 at the constraint metric 422 set by the controller 418. As shown in FIG. 6, some subsystems 401 may have a power consumption level which exceeds the threshold power level for the subsystem 401 at the constraint metric 422 set by the controller 418 (e.g., the first, second and third subsystems), while other subsystems 401 may have a power consumption level which is less than the threshold power level for the subsystem 401 at the constraint metric 422 set by the controller 418 (e.g., the fourth subsystem).

Where the power consumption level for a subsystem 401 is less than (or equal to) the threshold power level at the constraint metric 422, the subsystem 401 may be configured to operate at the current power consumption level. In this regard, the subsystem 401 may be configured to forego adjusting any power consumption level for the subsystem 401 when the subsystem 401 is operating within or at the threshold power level. As such, even where the device 400 is operated at a reduced power level, some subsystems 401 may not be implicated/impacted by the reduction in power consumption.

Where the power consumption level for a subsystem 401 is greater than the threshold power level at the constraint metric 422, the subsystem 401 may be configured to adjust a power consumption level for the subsystem 401. The subsystem 401 may be configured to reduce the power consumption level such that the power consumption level is less than or equal to the threshold power level at the constraint metric 422. In some embodiments, the subsystems 401 may be configured to adjust the power consumption level differently. For example, the display interface 406 subsystem 401 may be configured to adjust a power consumption level by reducing a screen resolution of the display, whereas the compression unit 410 subsystem 401 may be configured to adjust a power consumption level by decreasing a complexity/extent of encoding/decoding used to compress the data. As another example, a central processing unit 402 subsystem 401 may be configured to adjust a power consumption level by decreasing a clock frequency whereas a sensing unit 408 subsystem 401 may be configured to adjust a power consumption level by reducing a sensing sample rate. As such, and in some embodiments, each subsystem 401 may be preconfigured with steps or actions to perform to reduce power consumption level of the subsystem 401. Each of the subsystems 401 having a power consumption level that exceeds the threshold power level may be configured to adjust their power consumption level to be within their corresponding threshold, such that overall power consumption of the device is reduced. Such implementations may provide an application-based power management system that avoids hardware-based (e.g., global) power reduction techniques that can reduce/impact overall user experience.

Figure 7:
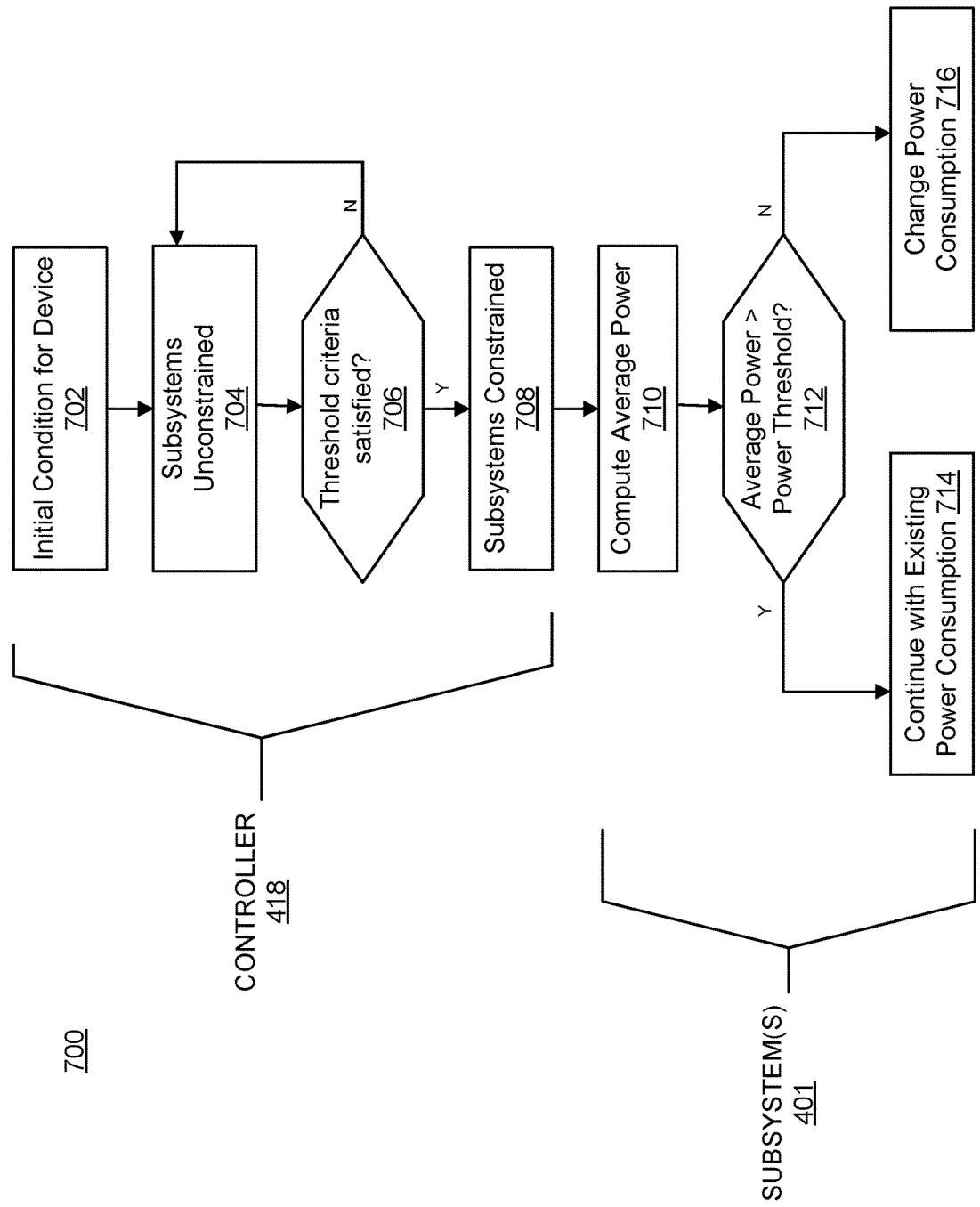
FIG. 7 is a flowchart showing a method for managing power consumption of device subsystems, according to an example implementation of the present disclosure.

Referring now to FIG. 7, depicted is a flowchart showing a method 700 of managing power consumption of device subsystems, according to an example implementation of the present disclosure. As shown in FIG. 7, some steps (e.g., steps 702-708) may be performed by the controller 418 (e.g., at the operating system 416 level), while other steps (e.g., steps 710-716) may be performed by the respective subsystems 401 at the subsystem 401 level. As a brief overview, at step 702, the controller 418 determines an initial condition for the device 400. At step 704, the subsystems 401 operate at an unconstrained level. At step 706, the controller 418 determines whether a threshold criteria is satisfied/reached. At step 708, the subsystems 401 operate at a constrained level (e.g., responsive to the threshold criteria being satisfied/reached). At step 710, the subsystems 401 compute an average power. At step 712 (which may be part of step 708), the subsystems 401 determine whether their average power exceeds a power threshold. If no, the subsystems may continue with their existing power consumption (step 714, which may be part of or a result of step 708). If yes, the subsystems can change 401 their power consumption (step 716, which may be part of or a result of step 708).

At step 702, the controller 418 determines a condition for the device 400. In some embodiments, the controller 418 determines a condition for the device 400 while the device 400 executes an application 414. The controller 418 may determine the condition while the device (e.g., at step 704) operates at an unconstrained level. In other words, step 702 and step 704 may be performed at the same time, simultaneously, at overlapping (or partially overlapping) time periods, etc. In some embodiments, the controller 418 may determine the condition using various sensor measurement(s) of the device 400. For example, the condition may be a power consumption of or across the device 400 (e.g., across the subsystems 401 of the device 400) over a time period, a thermal output or condition of the device 400, etc. as the device 400 executes/supports the application. In other words, the condition may be or include a subsystem-wide (or total) power consumption level of the device 400 and/or a temperature or thermal output of the device 400. The controller 418 may determine the condition based on, according to, or using sensor data from one or more sensors of the device 400 (e.g., power measurement sensor(s), thermal/temperature sensor(s), etc.). In some embodiments, the controller 418 may determine the condition at various intervals. For example, the controller 418 may periodically determine the condition of the device 400 while the device 400 executes an application 414. In some embodiments, the controller 418 is part of an operating system 416 for the device or includes the operating system 418. In other words, the controller 418 may be implemented or otherwise provided at the operating system-level.

At step 706, the controller 418 determines whether a threshold criteria is satisfied. In some embodiments, the controller 418 may determine to operate the device 414 at a reduced power level for a first application, based on the condition (e.g., identified at step 702) for the device 400 satisfying at least one threshold criteria. The controller 418 may determine/project that the threshold criteria is satisfied by the condition responsive to, for example, the temperature/thermal output/power consumption exceeding (or being equal to) a thermal or power threshold of a thermal threshold criteria or a power threshold criteria when/if the device 400 (e.g., each of the subsystems 401 of the device 400) operates at a full power level or otherwise at an unconstrained level (e.g., at step 704). The controller 418 may maintain a thermal threshold and/or a power threshold for the device 400. The controller 418 may compare the (e.g., actual/determined/projected) condition of the device 400 (e.g., identified at step 702) to the thermal threshold and/or power threshold as the subsystems 401 of the device 400 executing/operating in an unconstrained manner (e.g., operate at full utilized/consumed power).

In some embodiments, the threshold criteria may be satisfied responsive to either (e.g., any) threshold of the power threshold or thermal threshold being exceeded by the corresponding device power or device thermal condition. If at step 706, the controller 418 determines that the threshold criteria is not satisfied/reached (e.g., device power consumption is less than the device power threshold or the device thermal condition is less than the device thermal threshold), the method 700 may proceed back to step 704 (e.g., where the subsystems 401 operate in an unconstrained manner). On the other hand, if at step 706, the controller 418 determines that the threshold criteria is satisfied, the method 700 may proceed to step 708.

At step 708, at least some of the subsystems 401 may (be caused/configured to) operate at a constrained level (e.g., responsive to the threshold criteria being satisfied/reached, for example a power/thermal threshold being exceeded). In some embodiments, the controller 418 may determine a constraint metric to apply responsive to determining to operate at the reduced power level. In some embodiments, the controller 418 may determine the constraint metric based on the difference between the threshold and the condition (e.g., the difference between the device power consumption level and device power threshold, or the difference between the device thermal/temperature condition and device temperature threshold). In some embodiments, the constraint metric may be inversely proportional to the difference. For example, as the difference increases positively (e.g., device power consumption level increases beyond the device power threshold), the controller 418 may proportionally reduce/tighten (the value of) the constraint metric. The controller 418 may apply the constraint metric responsive to determining to operate at the reduced power level. The controller 418 may apply the constraint metric by setting a value used by each of the subsystems 401 for selectively adjusting their power consumption level. The controller 418 may apply the constraint metric agnostic to the individual subsystems 401. For example, the controller 418 may apply the constraint metric or value that is global (e.g., device wide) to each of the subsystems 401, and the subsystems 401 may use the global constraint metric to adjust their power consumption. In at least some of these embodiments, the constraint metric may be a device-wide value set by the controller 418, and can be used by at least some of the subsystems 401 in connection with a particular constraint metric table corresponding to an application executing on the device for adjusting a power consumption of the subsystem 401.

In some embodiments, the controller 418 may set, identify, or otherwise determine the constraint metric based on the application executing, deployed, or otherwise supported by the device 400. For example, the controller 418 may include one or more constraint metrics to be used for different applications or application types of applications executable on the device. The constraint metrics may be pre-calibrated or otherwise pre-configured for the application (e.g., to throttle or otherwise reduce power consumption at the subsystem level). The controller 418 may determine the application (or application type for the application) executing on the device, and select the constraint metric which corresponds to the application/application type.

In some embodiments, the controller 418 may set, identify, or otherwise determine the constraint metric based on a difference between the condition of the device and a corresponding threshold. The controller 418 may compute the constraint metric based on the condition of the device 400 separate from or agnostic to the application which is executing on the device 400. In other words, while the device 400 executes or otherwise is deploying an application, the controller 418 may determine a condition of the device, and use the condition for determining or computing the constraint metric. However, the controller 418 may not consider the application (or application type) as part of determining the constraint metric. The controller 418 may set the constraint metric for each of the subsystems and provide (e.g., separately or in connection with setting the constraint metric) an indication of the application (or application type of the application) executing on the device 400. In this sense, the constraint metric may be a value or index used by the subsystems 401 for selectively adjusting their power consumption level using the constraint metric and constraint metric table which corresponds to the application/application type of the application executing on the device.

In some embodiments, the controller 418 may apply the constraint metric by transmitting, sending, or otherwise providing the constraint metric to each of the subsystems 401 of the device 400. In some embodiments, the device 400 may access, include, or otherwise maintain one or more constraint metric tables for applications which are executable/supported on the device 400. For instance, the application may execute on the device 400 (e.g., on a CPU of the device 400), be fully or partially provisioned to the device from one or more remote sources, or may otherwise be executable on, supported by, or otherwise provided by the device 400. The constraint metric tables may specify respective power levels for subsystems 401 of the device 400. The constraint metric tables may be specific to a respective application or application type of application(s) executable on the device 400. In some embodiments, the device 400 may maintain an application-specific constraint metric table which may be used for a specific/individual application. In some embodiments, the device 400 may maintain an application type-specific constraint metric table which may be used for several applications 414 having/sharing or characterized by a common application type. As described above with reference to FIG. 5A-FIG. 5C, the device 400 may maintain several constraint metric tables for different applications/application types. The constraint metric tables may specify power levels at different constraint metrics (e.g., constraint metric values) for different subsystems 401. The power levels may be precalibrated or otherwise preconfigured for each of the subsystems 401, for different applications/application types. For example, assuming the same constraint metric is applied at two points in time for two different applications (e.g., one application 414 executing at one time, and subsequently a different application 414 executing later on at a different time), a given subsystem 401 may have a different power level (or power threshold level) based on the different applications 414 respectively executing on the device 400 at different times. In other words, the device 400 may maintain a first constraint metric table which specifies a first power level for a subsystem for a first application 414 and a second constraint metric table which specifies a second power level for the same subsystem for a second application 414.

As described in greater detail below, the subsystems 401 of the device may selectively modify their respective power consumption level using the constraint metric and a constraint metric table corresponding to the application 414 executing on the device 400. The subsystems 401 may each identify the constraint metric table (e.g., from the one or more constraint metric tables maintained by the device 400) which corresponds to an application 414 which is executing/operating/supported on the device 400. In some embodiments, the subsystems 401 may identify the constraint metric table responsive to receiving the constraint metric from the controller 418. In some embodiments, the subsystems 401 may identify the constraint metric table responsive to the application 414 being launched (e.g., by the user of the device 400), and/or the constraint metric. The subsystems 401 may identify the constraint metric table using a look-up of an application name/application identifier for the application 414, using tags of the application 414, etc. as described above.

At step 710, the subsystems 401 can compute an average power. In some embodiments, a first subsystem 401 computes an average/peak/instantaneous power (e.g., an average/peak/instantaneous power consumption) for the first subsystem 401. In some embodiments, the first subsystem 401 may compute an average power of the first subsystem 401 over a time period (e.g., a number of seconds, minutes, etc.). The first subsystem 401 may compute the average power of the first subsystem 401 using a current draw and voltage level of the first subsystem 401 over the time period. It is noted that, while hereinafter described as a first subsystem 401, each of the subsystems 401 may separately (e.g., in parallel/simultaneously/etc.) perform steps 710-716.

At step 712, the subsystems 401 can determine whether their average/peak/instantaneous power exceeds a power threshold. In some embodiments, the first subsystem 401 may identify a power threshold which corresponds to the first subsystem 401 and the constraint metric (e.g., set by the controller at step 708 as described above). For example, the first subsystem 401 may identify the power threshold by performing a look-up in the identified constraint metric table that corresponds to the application 414 executing on the device 400. The first subsystem 401 may perform the look-up using the constraint metric set by the controller 418 and an identifier for the first subsystem 401, to identify the power level which corresponds to the first subsystem 401. The first subsystem 401 may compare the average/peak/instantaneous power (e.g., determined at step 710 for the first subsystem 401) to the threshold power level from the constraint metric table.

If at step 712, the average/peak/instantaneous power is within (e.g., is less than or equal to) the threshold power level from the constraint metric table for the first subsystem, the first subsystem 401 may continue operation with the existing power consumption or without constraint on its power consumption (step 714). In this regard, the first subsystem 401 may determine that a current power consumption level is within the power level for the first subsystem specified in the constraint metric table. On the other hand, if at step 712, the average/peak/instantaneous power is outside (e.g., is greater than) the threshold power level from the constraint metric table for the first subsystem, the first subsystem 401 may change, alter, update, reduce, constraint or otherwise modify the power consumption level according to the threshold power level specified in the constraint metric table for the first subsystem 401 (step 716). In some embodiments, each subsystem 401 may modify their respective power consumption level in a different manner according to functions performed by the respective subsystem 401.

As noted above, each of the subsystems 401 may perform the steps 710-716 responsive to the controller 418 setting/assigning/communicating a constraint metric. Since the constraint metric tables specify different power levels for each of the subsystems 401 depending on the application 414/application type of the application 414 executing on the device 400, the subsystems 401 may be impacted to a different degree. For instance, a given constraint metric may cause a first subsystem 401 of the device 400 to adjust a power consumption level of the first subsystem to a different degree (e.g., percentage, or absolute amount) than a second subsystem 401 of the device, depending on the application 414 executing on the device. For example, one subsystem 401 may bypass adjustment of a power consumption level of the subsystem 401 based on the constraint metric and the corresponding power level from the constraint metric table for the application 414, where another subsystem 401 may reduce their power consumption level based on the same constraint metric (since the subsystem 401 in this example would have a power consumption level which exceeds the power level from the constraint metric table).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general or special purpose computer or other machine with a processor. By way of example, such machine-readable media can comprise RAM, ROM, EPROM, EEPROM, or other optical disk storage, magnetic disk storage, or other magnetic storage devices, or any other medium which can be used to carry or store desired program code in the form of machine-executable instructions or data structures and which can be accessed by a general or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings, and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   maintaining, by a device, one or more constraint metric tables for applications executable on the device, each of the one or more constraint metric tables specifying respective power levels for subsystems of the device according to a respective application or a respective application type of the respective application;
   detecting, by the device, based on data from one or more sensors, a condition of the device, the condition comprising at least one of a power condition or a thermal condition and the one or more sensors comprising at least one of a power sensor or a temperature sensor;
   determining, by the device, to operate the device at a reduced power level for a first application, the device determining to operate at the reduced power level based on the condition for the device satisfying at least one of a thermal threshold criteria or a power threshold criteria when the device operates at a full power level; and
   applying, by the device, a constraint metric responsive to determining to operate at the reduced power level, to cause a subset of the plurality of subsystems to adjust a power consumption level according to a first constraint metric table corresponding to the first application, the first constraint metric table being associated with a plurality of applications having an application type which is the same as the first application.

2. The method of claim 1, wherein applying the constraint metric comprises transmitting, by a controller of the device, the constraint metric to each of the subsystems of the device.

3. The method of claim 2, wherein the controller is part of an operating system for the device or comprises the operating system.

4. The method of claim 1, further comprising:
   identifying, by a first subsystem, the first constraint metric table of the one or more constraint metric tables according to at least one of: the first application or the applied constraint metric; and
   modifying, by the first subsystem, a power consumption level of the first subsystem, according to a power level specified in the first constraint metric table for the first subsystem.

5. The method of claim 4, wherein the power level is a first power level for the first subsystem, the method further comprising:
   identifying, by a second subsystem, the first constraint metric table; and
   determining, by the second subsystem, that a current power consumption level of the second subsystem is within a second power level for the second subsystem specified in the first constraint metric table.

6. The method of claim 1, wherein the one or more constraint metric tables includes the first constraint metric table for the first application and a second constraint metric table for a second application, the first constraint metric table specifying a first power level for a first subsystem, and the second constraint metric table specifying a second power level for the first subsystem different from the first power level.

7. The method of claim 1, wherein the constraint metric causes a first subsystem of the plurality of subsystems to adjust a power consumption level of the first subsystem by a first degree, and causes a second subsystem to bypass adjustment of a power consumption level of the second subsystem or to adjust the power consumption level of the second subsystem by a second degree different from the first degree.

8. The method of claim 1, wherein the condition satisfying the at least one of the thermal threshold criteria or the power threshold criteria when the device operates at the full power level comprises:
   a power consumption of the device being greater than or equal to a power threshold, or a temperature or thermal output of the device being greater than or equal to a thermal threshold, when the device operates at the full power level.

9. The method of claim 1, wherein the plurality of subsystems comprises at least one of: an audio subsystem, a camera subsystem, a sensor subsystem, a communication subsystem, a display unit subsystem, a central processing unit (CPU) subsystem, or a graphics processing unit (GPU) subsystem.

10. A device comprising:
    a plurality of subsystems;
    one or more sensors configured to detect a condition of the device, the one or more sensors comprising at least one of a power sensor or a temperature sensor;
    one or more constraint metric tables for applications executable on the device, each of the one or more constraint metric tables specifying respective power levels for one or more subsystems of the plurality of subsystems according to a respective application or a respective application type of the respective application; and one or more processors communicably coupled to the plurality of subsystems, the one or more processors configured to:
- detect, based on data from the one or more sensors, the condition of the device, the condition comprising at least one of a power condition or a thermal condition;
- determine to operate the device at a reduced power level for a first application, the one or more processors determining to operate the device at the reduced power level based on the condition for the device satisfying at least one of a thermal threshold criteria or a power threshold criteria when the device operates at a full power level; and
- apply a constraint metric responsive to determining to operate the device at the reduced power level, to cause a subset of the plurality of subsystems to adjust a power consumption level according to a first constraint metric table corresponding to the first application, the first constraint metric table being associated with a plurality of applications having an application type which is the same as the first application.

11. The device of claim 10, wherein the one or more processors are further configured to transmit the constraint metric to each of the plurality of subsystems of the device.

12. The device of claim 10, wherein a first subsystem of the plurality of subsystems is configured to:
- identify the first constraint metric table of the one or more constraint metric tables according to the first application; and
- modify a power consumption level according to a power level specified in the first constraint metric table for the first subsystem.

13. The device of claim 12, wherein the power level is a first power level for the first subsystem, and wherein a second subsystem of the plurality of subsystems is configured to:
- identify the first constraint metric table; and
- determine that a current power consumption level of the second subsystem is within a second power level for the second subsystem specified in the first constraint metric table.

14. The device of claim 10, wherein the one or more constraint metric tables includes the first constraint metric table for the first application and a second constraint metric table for a second application, the first constraint metric table specifying a first power level for a first subsystem, and the second constraint metric table specifying a second power level for the first subsystem different from the first power level.

15. The device of claim 10, wherein the constraint metric causes a first subsystem of the plurality of subsystems to adjust a power consumption level of the first subsystem by a first degree, and causes a second subsystem to bypass adjustment of a power consumption level of the second subsystem or to adjust the power consumption level of the second subsystem by a second degree different from the first degree.

16. The device of claim 10, wherein the condition satisfying the at least one of the thermal threshold criteria or the power threshold criteria when the device operates at the full power level comprises:
- a power consumption of the device being greater than or equal to a power threshold, or a temperature or thermal output of the device being greater than or equal to a thermal threshold, when the device operates at the full power level.

17. The device of claim 10, wherein the plurality of subsystems comprises at least one of: an audio subsystem, a camera subsystem, a sensor subsystem, a communication subsystem, a display unit subsystem, a central processing unit (CPU) subsystem, or a graphics processing unit (GPU) subsystem.

18. A non-transitory computer readable medium storing instructions that, when executed by one or more processors of a device, cause the one or more processors to:
- execute an operating system of the device, the operating system configured to:
  - detect, based on data from one or more sensors, a condition of the device, the condition comprising at least one of a power condition or a thermal condition and the one or more sensors comprising at least one of a power sensor or a temperature sensor;
  - determine to operate the device at a reduced power level for a first application, the operating system determining to operate the device at the reduced power level based on the condition for the device satisfying at least one of a thermal threshold criteria or a power threshold criteria when the device operates at a full power level; and
  - apply a constraint metric responsive to determining to operate the device at the reduced power level, to cause a subset of a plurality of subsystems of the device to adjust a power consumption level according to a first constraint metric table corresponding to the first application, the first constraint metric table being associated with a plurality of applications having an application type which is the same as the first application.

* * * * *